Oct. 31, 1950  R. C. FEAGIN  2,528,219
METHOD OF MAKING THERMOPLASTIC ARTICLES
Filed March 11, 1947  4 Sheets-Sheet 1
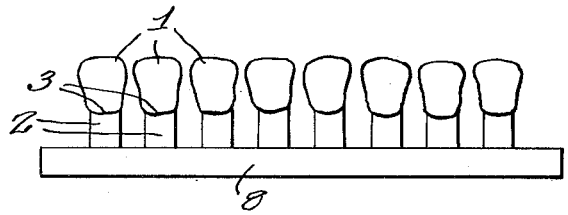
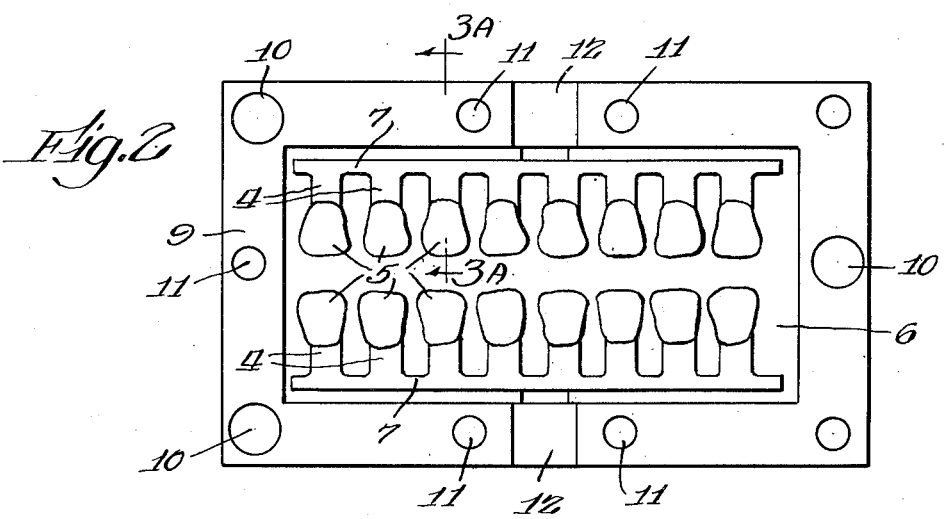
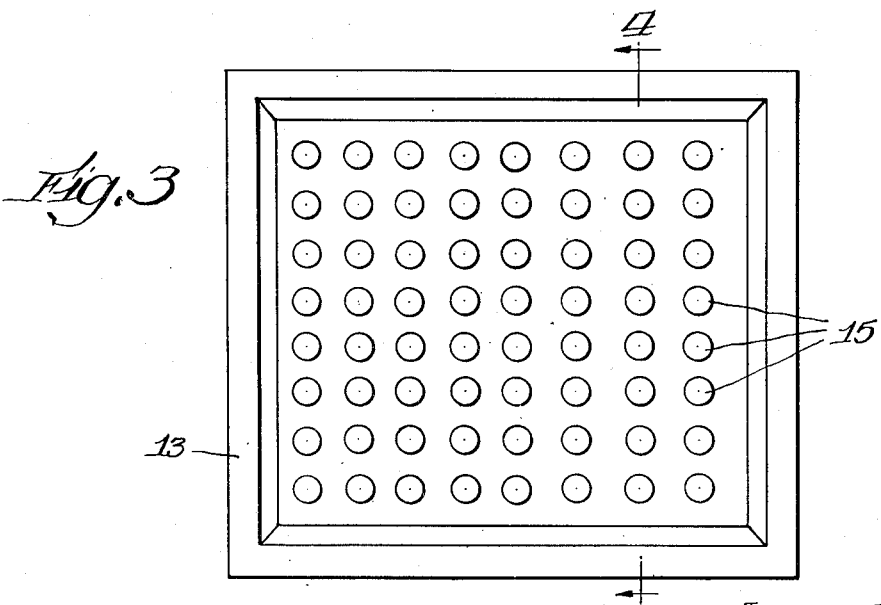
Inventor:
Roy C. Feagin
By Brown, Jackson, Boettcher & Dienner
Attys.

Oct. 31, 1950 R. C. FEAGIN 2,528,219
METHOD OF MAKING THERMOPLASTIC ARTICLES
Filed March 11, 1947 4 Sheets-Sheet 2
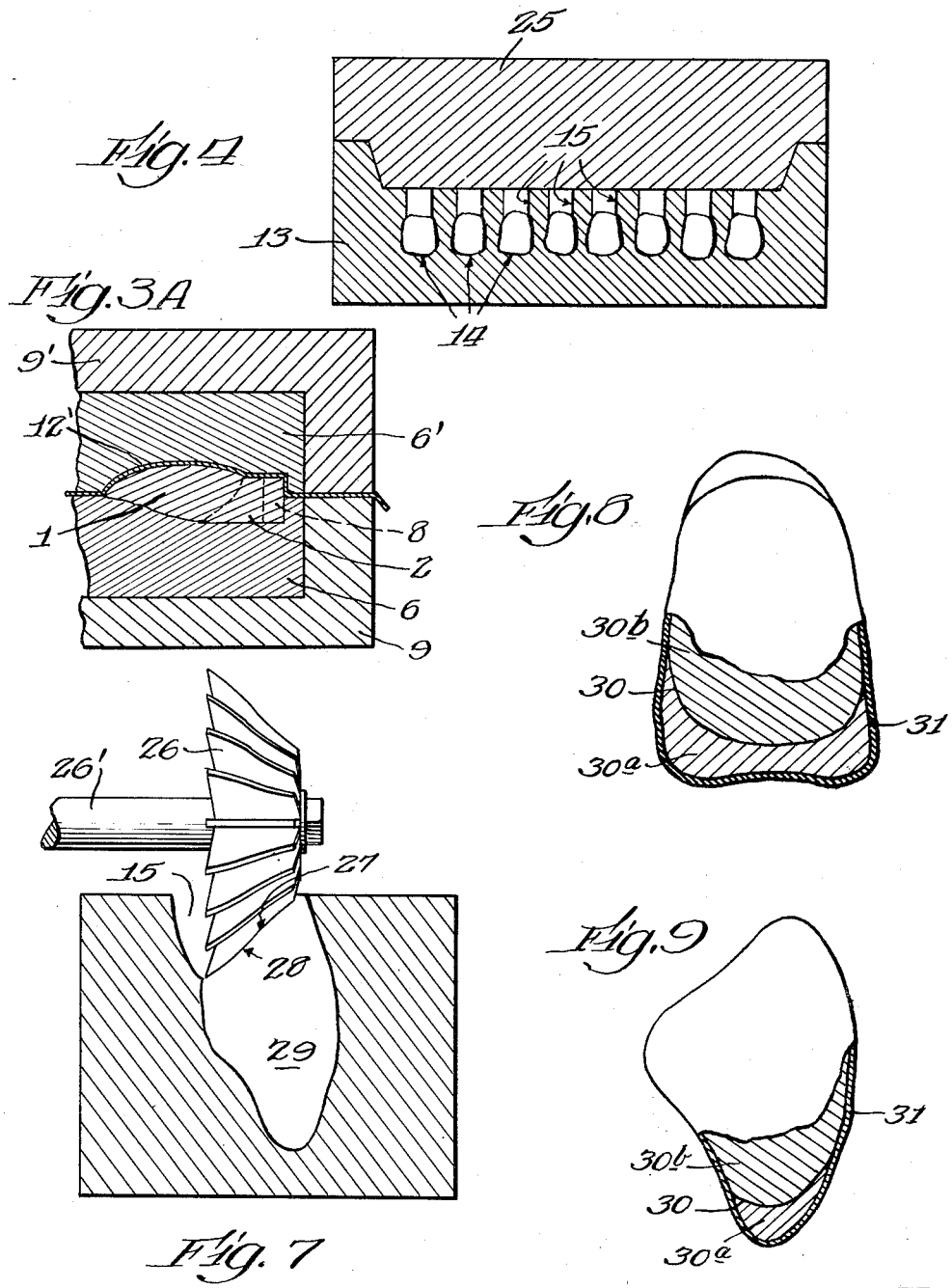
Inventor:
Roy C. Feagin
By Brown, Jackson, Boettcher & Dienner
Attys Oct. 31, 1950        R. C. FEAGIN        2,528,219
METHOD OF MAKING THERMOPLASTIC ARTICLES
Filed March 11, 1947        4 Sheets-Sheet 4
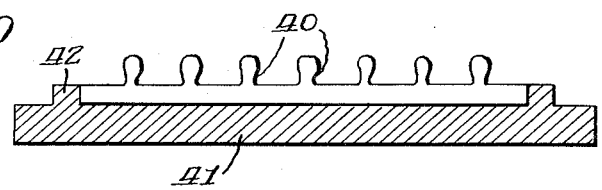
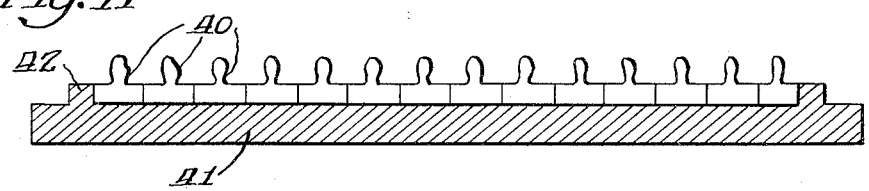
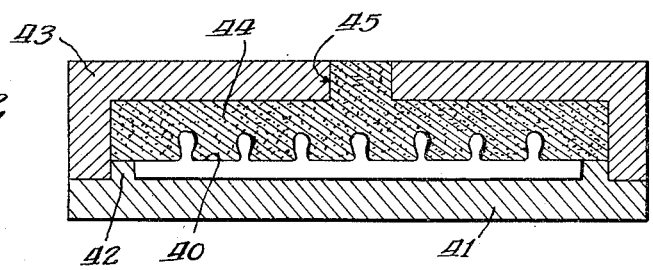
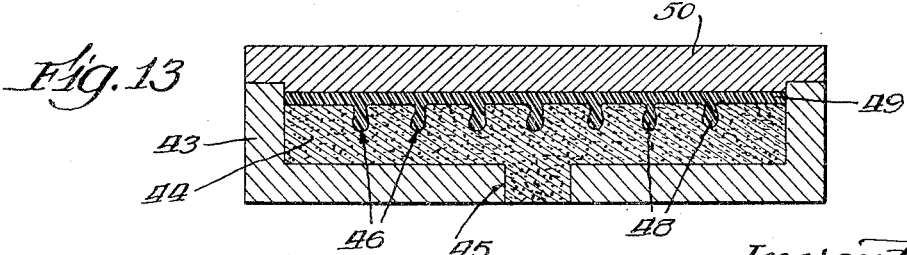
Inventor:
Roy C. Feagin Patented Oct. 31, 1950

2,528,219

UNITED STATES PATENT OFFICE 2,528,219

METHOD OF MAKING THERMOPLASTIC ARTICLES

Roy C. Feagin, Flushing, N. Y., assignor to Austenal Laboratories, Incorporated, New York, N. Y., a corporation of New York Application March 11, 1947, Serial No. 733,892

11 Claims. (Cl. 18—55.1)

This invention relates to a method of making thermoplastic articles, and has particular relation to a method of making artificial teeth.

In the past, various methods have been used for making plastic or synthetic resin-like teeth and other articles of plastic or synthetic resin-like material. In general, these methods are as follows:

1. *Compression molding.*—This method uses two mold halves containing cavities into which powder is placed and subsequently heated to molding temperature. The two mold halves are then closed by suitable pressure to produce the molded article.

2. *Injection molding.*—According to this method the preheated plastic or synthetic resin-like material is injected under pressure into the mold cavity.

3. *Transfer molding.*—In this method a plastic or synthetic resin-like pre-form is heated outside of the mold and then transferred to the mold cavity, after which the mold halves are closed together by means of suitable pressure to form the molded article. This method is used primarily for thermosetting materials.

4. *Monomer-polymer molding.*—This method has been used in making dentures and artificial teeth, and is carried out by mixing polymerizable material with its polymer or other polymers to form a plastic dough. This dough is compressed into a mold cavity and is then cured under compression until the molded piece is hard or completely cured.

All of these prior methods of making plastic or synthetic resin-like teeth in metal molds have the objection of leaving "flash" or excess material on the teeth as the result of the interruptions or parting lines between the metal mold parts. This has necessitated grinding operations or other individual or hand finishing or handling of the teeth. These operations increase the labor cost and mar the desired faithful reproduction of detail in the surfaces of the teeth.

One of the main objects of the present invention is to provide an improved method with which the problems heretofore encountered in making plastic or synthetic resin-like teeth are eliminated; more particularly, a method which will form plastic or synthetic resin-like teeth or like articles without "flash" or excess material thereon whereby grinding operations or other individual or hand finishing or handling of the teeth is unnecessary; and marring or obliteration of the desired faithful reproduction of detail in the surfaces of the teeth is avoided.

Another object of the invention is to provide a method which will enable the making of plastice or synthetic resin-like teeth and like articles with a low capital investment, since very cheap molds may be used to produce teeth on a quantity basis.

Another object of the invention is to provide a method with which the labor cost is lower than with present methods, and which lend themselves to automatic or machine handling and which will permit utilization of the casting or monomer-polymer method, thus eliminating prolonged tie-up of expensive metal molds in making plastic or synthetic resin-like teeth.

Another object of the invention is to provide a method which, in case of fire or destruction of the mold and manufacturing facilities, will permit rapid reproduction of these facilities and which will enable great flexibility in changing the design of the teeth, since there is no large fixed investment in expensive molds.

Another object of the invention is to provide a method which lends itself to one step characterizing of teeth, in that characterization stains may be applied to the original plaster-like mold or clear veneer before curing of the gingival color, thereby eliminating after treatment or staining of the tooth.

Further objects and advantages of the invention will appear from the following detailed description, taken in connection with the accompanying drawings, in which:

Figure 1 is a labial view of a group of metal master teeth with sprue shanks and a base sprue attached thereto;

Figure 2 is a top plan view of the lower part of the duplicate pattern forming mold;

Figure 3 is a top plan view of the lower half of the tooth mold;

Figure 3A is a fragmentary sectional view through the tooth mold, taken substantially on the line 3A—3A of Figure 3;

Figure 4 is a sectional view through the lower half of the tooth mold taken substantially on the line 4—4 of Figure 3 and showing the top half of the tooth mold applied thereto;

Figure 7 shows the step of removing the teeth from the sprues and milling the ridge laps on the finished teeth;

Figure 8 is a labial view of one of the finished teeth partially in section;

Figure 9 is a distal view of the tooth shown in Figure 8 partially in section;

Figure 10 is a cross section looking from the end and showing another embodiment of the invention in which duplicate tooth patterns formed, for example, of wax are positioned in proper alignment in a set-up plate;

Figure 11 is a cross section looking from the side or at right angles to Figure 10;

Figure 12 is a cross section looking from the end and showing a flask containing the investment set-up plate and tooth patterns of Figures 10 and 11; and Figure 13 is a cross section looking from the end and showing the flask containing the investment and plastic teeth in position in the flask before their removal.

Figure 5:
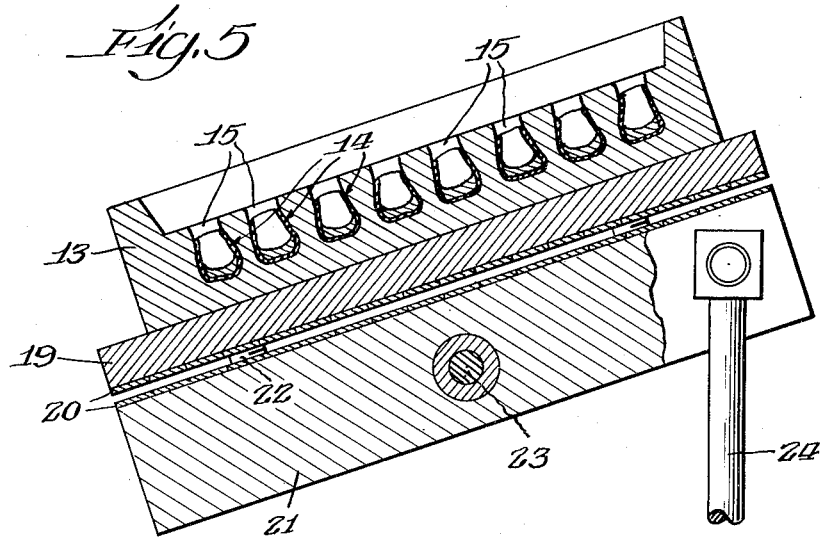
Figure 5 is a more or less diagrammatic sectional view showing one form of rocking device for rocking the mold mesially-distally after introducing the incisal mixture into the mold cavities of the tooth mold.

Referring now to the drawings, the permanent master teeth 1 shown in Figure 1 are preferably made of metal, such as stainless steel, brass, Stellite, or other metals or alloys.

Attached to the master teeth 1 may be metal shanks 2 projecting from the ridge laps 3 and approximately the same diameter as the teeth. The shanks 2 form pouring spouts or sprue channels 4 for introducing the duplicate pattern material into the tooth cavities 5 of the duplicate pattern mold which is formed about the master teeth 1 and comprises, for example, complementary mold parts 6 and 6' as shown in Figures 2 and 3A. Alternatively, the sprue channels 4 and feeder sprues 7 may be milled or ground in the duplication mold.

If the sprue shanks 2 are attached to the master teeth 1, the master teeth may be mounted as shown in Figure 1 on a base sprue 8 of approximately the same thickness as the sprue shanks 2. In such case the base sprues 8 form the feeder sprues 7 in the duplication mold 6. The master teeth 1 are preferably mounted perfectly in line mesially-distally with each other, with the ridge laps 3 of the respective master teeth 1 equidistant from the base sprue 8. This aids in the milling operation to remove the synthetic resin-like material formed in the sprue channels of the tooth mold from the finished teeth, as will hereinafter appear.

After the master teeth 1 are prepared, they are used as master patterns for producing the duplication mold 6, 6'. The mold 6, 6' may be made of any suitable material, such as hard stone, low melting point alloy, brass, or any other suitable material. If shanks 2 and base 8 have not been attached to the master teeth, the sprue channels 4 and feeder sprues 7 may be milled or ground in the duplication mold 6 as previously mentioned. The procedure followed in making the duplication mold 6 may, for example, be that disclosed in prior U. S. patent of Eric H. Zahn, No. 2,306,516, issued December 29, 1942, or in the copending application of Eric H. Zahn, Serial No. 524,025, filed February 26, 1944, now U. S. Patent 2,459,402 issued January 18, 1949.

The pattern mold 6, 6' shown with the master teeth therein in Figure 3A may have an outer reinforcing shell or flask 9, 9' provided with dowels 10 for positioning the complementary parts of the mold 6 and fastening screws 11 for fastening the mold parts together. The flask 9 has sprues or channels 12 for introduction of the duplicate pattern material into the tooth cavities 5 through the feeder sprues 7 and sprue channels 4. A membrane or separating medium according to the above mentioned Zahn patent is shown at 12' in Fig. 3A.

The material for the duplicate patterns formed in the mold 6 is preferably a plastic, wax, or some destructible material. One method is to use a suitable wax material, such as the following:

| | Per cent |
|---|---|
| Paraffin (M. P. 130–135° F.) | 80 |
| Carnauba wax | 20 |

The latter wax is a Brazilian palm-wax; also the wax from its leaves. After completion of the mold 6, removal of the master patterns therefrom, and bringing the mold parts 6, 6' into complementary relation, the foregoing wax material may be injected, pressed, poured or formed in the mold 6 in any desired manner. By injection molding the duplicate patterns may be formed in excellent detail and at a very rapid rate.

The wax patterns may then be removed from the duplication mold and electroplated or sprayed with any suitable material, such as copper, silver, cobalt, cadmium, nickel, low fusing alloys or the like, to a suitable thickness, preferably over .001 inch in order to form a dense and relatively impervious coating. A very finely divided copper, graphite, or electrically conductive powder may be applied to the duplicate patterns prior to electroplating. After the necessary plated or sprayed thickness has been obtained, the metal coated pattern is then ready to be surrounded with the destructible mold material, such as plaster of paris, gypsum or the like, as will presently appear.

It is also contemplated to use for the duplicate patterns a suitable flexible material, such as rubber, plasticized plastic material such as ethyl cellulose, cellulose acetate, polyvinyl chloride, vinyl chloride-vinyl acetate copolymer, polyvinyl alcohol, or such materials as impression colloid, alginic materials, gelatin, glue and the like, or any other suitable flexible material. The pattern may be formed in the duplication mold in any suitable manner. An injection method is preferred whenever possible, since, by injecting the moldable material into the closed mold, any "flash" or parting line on the pattern may be eliminated. In some cases it may be necessary to polymerize, vulcanize or cure the material. For example, material of synthetic rubber, such as Ameripol, has been used. Curing is necessary below the softening point of the duplication mold. It is necessary, or at least desirable, to cure an Ameripol synthetic rubber at 100° C. for at least twenty-four hours to obtain a good cure to give the desired physical properties.

Other duplicate pattern materials that may be employed are suitable low fusing alloys, such as tin-bismuth alloys, "Cerrosafe," "Cerrodent," "Cerrobend" or the like. These patterns may be removed from the tooth mold by acids or other solvents, or, preferably, by melting from the mold.

The duplicate patterns, upon completion and removal from the duplicate pattern mold, are set up in a metal flask in a convenient manner. The tooth mold material, for example plaster of Paris, gypsum investment, Tamastone, or low fusing metal or alloy, is then poured or otherwise formed around the duplicate patterns to form the bottom half 13 of the tooth mold shown in Figures 3 and 4. A gypsum or plaster bonded material is preferable for the tooth mold 13, because of its cheapness and ease of handling. This plaster material may be used mixed with water for the mold material, or with other agents, such as water soluble plastics, glue, gelatin, alginates, starch, casein, water glass or other suitable agents. These materials are used primarily to seal the mold to prevent seepage of the plastic or synthetic resin-like material into the mold. They also offer some additional strengthening means for the mold.

The tooth mold material is then allowed to set entirely hard. The duplicate patterns are then removed from the mold. It may or may not be desirable to dry the molds before use or further treatment. It has been found that additional treatment of the mold with various coating or sealing agents appears to be advantageous. These coating, impregnating or sealing agents may be the same as those mentioned above, or may be others, such as cellulose acetate, Methocel, polyvinyl alcohol, polyethylene, furan resins or any other suitable material which will seal the pores of the plaster and provide protective coatings for the mold cavities. Such materials are also used to prevent adhesion of the plastic or synthetic resin-like teeth to the plaster-like mold and to give some gloss or luster to the teeth.

One particular procedure which has been utilized is first to pour a thin mix of plaster of Paris and water around, for example, a synthetic rubber pattern. After it has set, the pattern is removed, leaving a mold cavity shaped to the configuration of the tooth or other article and having the surfaces of the cavity uninterrupted and free of parting lines. The mold is then dried at about 105° C. until it is essentially free of water. In drying, the mold may be dried first at a relatively low temperature of about 88° C. and then at a higher temperature of about 105° C. to eliminate any moisture. The mold is then immersed in a heated 10% solution of fish glue and water for a short period of time, and cooled preferably in the solution. The result is a slight impregnation into the plaster with a glossy film formed on the surface of the mold cavity. Such a mold is then complete and ready for use, and it has, for example, the tooth cavities 14 and sprue channels 15 opening into the ridge lap ends thereof as shown in Figure 4.

The mold 13 is then ready for production of the plastic or synthetic resin-like teeth. Solutions of methyl methacrylate polymer and other plastic polymers, such as dichlorostyrene, have been used as plastic materials for making teeth according to the present invention. At this stage, methyl methacrylate is preferred as the base plastic material, but this preference may vary. A clear plastic coating may first be formed over the surfaces of the mold cavities 14 to provide a clear plastic veneer over the outer surfaces of the finished teeth. Such a coating produces a very good effect on plastic teeth and may be formed in the mold from a solution of methyl methacrylate polymer in monomer or acetone, ethyl acetate, or other suitable solvents.

An example is the use of a 10% solution of polymeric methyl methacrylate in acetone to coat the mold cavity. The solvent is then evaporated, and the cavity may be recoated, if necessary, to give the proper or desired clear film thickness. Trichlorethylene and ethyl acetate have been used as the solvents. Low-boiling solvents are preferable. Monomeric methyl methacrylate may also be used as the solvent for the polymer, thereby obtaining a polymerization without entire solvent evaporation.

Allyl diglycol carbonate, known commercially as CR 39 monomer and made by the Pittsburgh Plate Glass Co., Barberton, Ohio, mixed with methyl methacrylate polymer to form a thick solution, has also been used and appears suitable for casting. Divinyl benzene monomer, diallyl maleate or tetrahydrofurfuryl allyl maleate monomers admixed with methyl methacrylate monomer may also be utilized in place of monomeric methyl methacrylate as mentioned herein.

The mold 13 may be rotated and heated until a uniform coating of desirable thickness is obtained on the surface of the mold cavity. After complete elimination of the solvent or polymerization of the polymerizable portion of the coating solution, an incisal mixture or solution containing the necessary pigments of the desired incisal color of the tooth is introduced into the mold cavities 14 and within the clear plastic veneer. Suitable solutions for the incisal formation are as follows:

1. Suitably pigmented methyl methacrylate polymer ------------------------------------ 30% } Diluted 50% with acetone
   Methyl methacrylate monomer -------------- 70%
2. Same monomer-polymer mix as No. 1, but diluted with 50% trichlorethylene.
3. Suitably pigmented methyl methacrylate polymer ------------------------------------ 20%
   Methyl methacrylate monomer -------------- 80%

These solutions are somewhat viscous but flow readily. Viscosity or the polymer concentration may be changed, depending upon the type of incisal desired.

Figure 6:
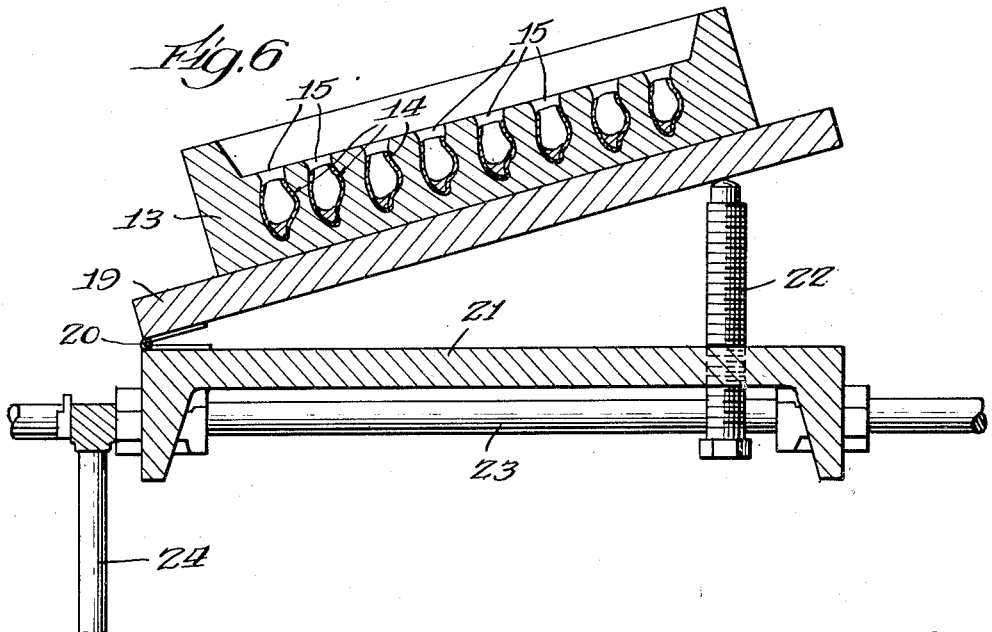
Figure 6 is a more or less diagrammatic sectional view of the rocking device taken at substantially right angles to Figure 5.

The mold 13 is then set on a rocking device, such as shown in Figure 5 or in Figure 6, having adjustable means for tilting the mold 13 toward the labial or the lingual in the desired manner, and rocking mesially-distally at a relatively slow rate of speed during the time that the mold is being heated to eliminate the necessary solvent and to carry out any polymerization or curing action.

The rocking device shown in Figures 5 and 6 comprises, in general, a tilting platform 19 for supporting the mold 13 and adapted to be tilted toward the labial or the lingual about a hinge or tilting mounting at 20 on a base 21. The means for tilting the platform 19 comprises a bolt 22 threaded through the base 21. The base 21 is mounted on a rotating shaft 23 and provided with a rocking arm 24, by means of which the base 21, platform 19 and mold 13 may be rocked mesially-distally in the manner and for the purposes set forth.

After the incisal has been formed of the proper thickness and intensity within the clear plastic veneer and completely cured or dried, the gingival is then introduced into the mold cavities and within the veneer and applied to the incisal portions. This may be done in a number of ways, depending upon the type of resin employed, temperature of cure, type of mold, and the like. It is possible to have a gingival colored casting solution of polymer in monomer and containing the necessary colored pigments thoroughly dispersed in the casting solution. An example is as follows:

Per cent
Pigmented polymeric methyl methacrylate___ 30
Monomeric methyl methacrylate (with 0.05% benzoyl peroxide) _____ 70

This solution may then be poured into the mold cavities. After pouring the necessary or desired quantity of casting solution into the mold cavities 14 and within the clear veneers, the total mold may then be treated with ultraviolet light to carry out the necessary curing of the plastic gingival portions. An alternative may be the use of any suitable type of heating oven, such as gas, electricity or infra-red, to produce the necessary temperature completely to polymerize the gingival casting solution.

Another method in producing the gingival is to make up a resinous monomer-polymer mixture to form dough. This dough may then be packed into the molds. A suitable mixture is as follows:

| | Parts |
|---|---|
| Pigmented polymeric methyl methacrylate | 40 |
| Monomeric methyl methacrylate | 100 |

The plunger or top half 25 of the mold 13 may then be applied to the lower half 13 containing the plastic or synthetic resin-like teeth, in a manner similar to processing denture bases by monomer-polymer technique, as shown, for example, in Figure 4. This figure shows the plunger or top part of the mold in relation to the bottom part. The total mold 13, 25 may then be placed in a press or clamp to maintain pressure on the gingival plastic material during the polymerization or curing period. The polymerization may be accomplished by any suitable means mentioned previously, such as heating in a water bath or oven.

Another preferred method is to have an injection molding attachment to the mold or flask. The injection gun is loaded with the gingival colored plastic material in any convenient and desirable form, and then the material is injected into the gingival cavities of the mold to fill the mold. Pressure is maintained on the plastic material during the suitable cures mentioned above. A suitable composition for injection is as follows:

| | Parts |
|---|---|
| Pigmented polymeric methyl methacrylate | 45 |
| Monomeric methyl methacrylate | 100 |

Any composition which utilizes monomeric methyl methacrylate may be modified with fillers, polymerization catalysts, inhibitors, pigments and the like. Examples of fillers are quartz, porcelain and the like. Examples of catalysts are benzoyl peroxide, hydrogen peroxide and the like. Inhibitors may be p-tertiary butyl phenol, hydroquinone and the like. Pigments may be titanium dioxide, iron oxide, cadmium red, or any other pigment to give satisfactory colorations.

After the curing is complete, the teeth are then ready to be removed from the mold 13. Since the teeth are lined up carefully in order that the ridge laps may be in a direct line with each other, a suitable milling cutter shown at 26 in Figure 7 and shaped at 27 to the shape of the tooth ridge lap 28, may be used to mill through the plaster-like mold 13 and the plastic material in order to remove the teeth 29 from the plastic parts formed in the sprue channels 15 and, at the same time, cut the desired ridge laps 28 into the teeth. The cutter 26 is carried by and rotates with a rotating shaft 26', as indicated in Figure 7. It leaves the finished teeth 29 in the plaster or plaster-like mold 13 separated from each other and from the plastic material formed in the sprue channels 15.

Any suitable knock-out device may be used to separate the plaster-like mold from the surrounding metal flask. After removal of the mold from the flask, it may then be placed under pressure of some type to break the teeth away from the plaster. The teeth may then be rolled in a suitable container containing water or any suitable liquid medium to separate or wash traces of plaster from them. The teeth will then be free from the plaster mold and will be without the desired polish.

On a production basis, polishing may be accomplished in a suitable tumbling barrel ordinarily used for deburring and polishing plastic and metal articles. This barrel may be of hexagonal or octagonal shape, or may contain any suitable material which acts to provide a polishing or deburring action. We prefer to use wooden chips or a suspension of a fine abrasive in water or liquid medium for this operation because they may be separated easily from the teeth after completing the polishing. It has been found that upwards to 48 hours may be necessary to produce the desired polish, but this method eliminates all hand polishing operations on the teeth.

As shown in Figures 8 and 9, the finished teeth comprise a synthetic resin-like body 30, colored to the desired coloring of the tooth, and a clear, transparent, plastic veneer 31 extending over and forming the outer surface of the finished tooth. More particularly, the synthetic resin-like body 30 comprises a plastic material 30a colored for the incisal portion of the tooth and a second plastic material 30b applied to the incisal portion 30a and colored for the gingival or remaining portion of the tooth body.

The procedure according to the embodiment of the invention shown in Figures 10 through 13 is as follows:

The wax or other duplicate tooth patterns 40, after being produced in the wax injection or duplicating mold as previously described, are placed in the set-up plate 41 which has an upstanding rib 42 for holding them in proper alignment. The flask 43 (Figure 12) is then placed around the tooth patterns 40 and over the set-up plate 41 and positioned by telescoping engagement over the rib 42. The hydrocal or investment mixture 44 with water is then poured or introduced through the opening 45 in the flask 43 over the tooth patterns completely to embed the same and is allowed to set.

After the investment material 44 has become set, the set-up plate 41 is removed. The wax or other duplicate tooth patterns 40 are then removed from the mold, for example, by means of solvent, hot water, steam, or in any convenient manner, thereby leaving tooth cavities 46 in the mold. The mold is then dried for about two hours at about 200° F. and allowed to cool to room temperature. A 2% sodium alginate solution is then poured into the cavities 46 and immediately ejected, leaving a coating on the mold. This coating (not shown) is dried, and the mold is then ready for resin packing.

The resin powder is prepared in various shades, ranging from incisal to gingival colors. About four different stages of powder of the specific shades are added or introduced into each cavity 46, thereby giving a gradation of color to the teeth from incisal to gingival. After adding the different stages of colored methyl methacrylate polymer or other suitable material of fine particle size to the mold cavities, methyl methacrylate or other suitable monomeric materials are poured into the cavities to saturate the powder. The powder-liquid mix is then allowed to set until the mixture shown at 48 (Figure 13) reaches proper consistency. An excess of resin is used on top of the cavities as shown at 49 in Figure 13.

A compression plate 50 is then placed over the mold cavities and the resin is compressed and cured. As shown in Figure 13, this plate has a reduced positioning part which engages telescopically within the upper end of the flask 43. The monomer to polymer ratio is dependent upon polymer particle size, type of monomer, amount of pigment and other factors. After the teeth are cured (ordinarily for about one hour at about 70° C. and about thirty minutes at about 100° C. when methyl methacrylate is used as the monomer), the mold is cooled to room temperature. The compression plate 50 is then removed from the flask and the whole investment portion containing the teeth 48 is pressed out of the flask in one piece. The milling operation is then carried out to mill away the excess resin and to mill in the ridge laps as previously described. After this, if desirable, the exposed portion of the ridge lap may then be stamped with a hot stamping machine or by any convenient manner to denote the tooth designation. The teeth are then broken out of the mold and tumbled and finished where necessary.

The embodiments of the invention shown in the drawings are for illustrative purposes only, and it is to be expressly understood that such drawings and the accompanying specification are not to be construed as a definition of the limits or scope of the invention, reference being had to the appended claims for that purpose.

I claim:

1. The method of making artificial teeth free of parting lines, which comprises forming a relatively rigid unitary mold body having formed therein a mold cavity of the size and shape of the desired tooth and free of parting lines, filling said mold cavity with thermoplastic material comprising a polymerizable ingredient to form the body of the tooth, heating the thermoplastic tooth body while in the mold cavity to a temperature and for a period of time sufficient completely to polymerize the same to the form of the tooth, allowing the tooth to cool below the polymerization temperature while in the mold body, and destroying the mold body to remove the tooth therefrom free of parting lines.

2. The method according to claim 1 wherein the thermoplastic material is introduced into the mold cavity in a plurality of different colors and in successive stages to produce a predetermined shaded coloring of the tooth.

3. The method according to claim 1 wherein the thermoplastic material is introduced into the mold cavity in powdered form and in a plurality of different colors and in successive stages, and wherein after introducing the different stages of thermoplastic material in powdered form a monomeric material is introduced into the mold cavity.

4. The method according to claim 1 wherein the mold body is formed of plaster-like material capable of withstanding the polymerization temperature, and wherein the plaster-like mold body is broken away from the tooth in removing the same from the mold body.

5. The method of making artificial teeth free of parting lines, which comprises forming a relatively rigid mold body having formed therein a mold cavity of the size and shape of the desired tooth and free of parting lines, coating the surface of the mold cavity with a relatively clear resinous veneer of a character which will not be destroyed by polymerization of the tooth body and which forms a permanent part of the finished tooth, setting said veneer while on the surface of the mold cavity, filling the veneer-coated mold cavity with thermoplastic material comprising a polymerizable ingredient to form the body of the tooth, heating said thermoplastic tooth body while it and the veneer are in the mold cavity and to a temperature and for a period of time sufficient completely to polymerize the thermoplastic body of the tooth, allowing the tooth to cool below the polymerization temperature while in the mold body, and destroying the unitary mold body to remove the tooth therefrom with the resinous veneer covering the surface of the tooth and free of parting lines.

6. The method of making thermoplastic articles free of parting lines, which comprises forming a relatively rigid unitary mold body having formed therein a mold cavity of the size and shape of the desired article and free of parting lines, filling said mold cavity with thermoplastic material comprising a polymerizable ingredient to form the body of the article, heating the thermoplastic material while in the mold cavity to a temperature and for a period of time sufficient completely to polymerize the same to the form of the article, allowing the article to cool below the polymerization temperature while in the mold body, and destroying the unitary mold body to remove the article therefrom free of parting lines.

7. The method according to claim 6 wherein the thermoplastic material is introduced into the mold cavity in a plurality of different colors and in successive stages to produce a predetermined shaded coloring of the article.

8. The method according to claim 6 wherein the thermoplastic material is introduced into the mold cavity in powdered form and in a plurality of different colors and in successive stages, and wherein, after introducing the different stages of thermoplastic material in powdered form, a monomeric material is introduced into the mold cavity.

9. The method according to claim 6 wherein the mold body is formed of plaster-like material capable of withstanding the polymerization temperature, and wherein the plaster-like mold material is broken away from the article in removing the same from the mold body.

10. The method of making a thermoplastic article free of parting lines, which comprises forming a relatively rigid mold body having formed therein a mold cavity of the size and shape of the desired article and free of parting lines, coating the surface of the mold cavity with a clear resinous veneer of a character that will not be destroyed by polymerization of the body of the article and which forms a permanent part of the article, setting said veneer while on the surface of the mold cavity, filling the veneer-coated mold cavity with thermoplastic material to form the body of the article, heating said thermoplastic body while it and the veneer are in the mold cavity and to a temperature and for a period of time sufficient completely to polymerize the thermoplastic body of the article, allowing the article to cool below the polymerization temperature while in the mold body, and destroying the unitary mold body to remove the article therefrom with the veneer covering the surface of the article and free of parting lines.

11. The method according to claim 10 wherein the thermoplastic material forming the body of the article is introduced into the veneer-coated mold cavity in a plurality of different colors and in successive stages to produce a predetermined shaded coloring of the article.

ROY C. FEAGIN.

(References on following page)

REFERENCES CITED

The following references are of record in the file of this patent:

UNITED STATES PATENTS

| Number | Name | Date |
|---|---|---|
| 173,647 | Keightley | Feb. 15, 1876 |
| 1,328,351 | Whiteley, Jr. | Jan. 20, 1920 |
| 1,468,428 | Wells et al. | Sept. 18, 1923 |
| 1,547,643 | Clapp | July 28, 1925 |
| 1,769,807 | Sprinkle | July 1, 1930 |
| 2,181,694 | Felcher | Nov. 28, 1939 |
| 2,186,468 | Schwartz | Jan. 9, 1940 |
| 2,192,902 | Erdle | Mar. 12, 1940 |
| 2,202,712 | Myerson | May 28, 1940 |
| 2,234,993 | Vernon et al. | Mar. 18, 1941 |
| 2,314,957 | Thornton et al. | Mar. 30, 1943 |
| 2,391,106 | Saffir | Dec. 18, 1945 |
| 2,392,929 | Lee | Jan. 15, 1946 |
| 2,412,207 | Day | Dec. 10, 1946 |